US006510986B1

(12) United States Patent
Akutsu et al.

(10) Patent No.: US 6,510,986 B1
(45) Date of Patent: Jan. 28, 2003

(54) TRANSACTION RECORD STORING DEVICE AND TRANSACTION MACHINE INCLUDING SAME

(75) Inventors: Kazuhiro Akutsu, Gunma (JP); Kiyotaka Awatsu, Gunma (JP); Shigeaki Tashiro, Gunma (JP); Takashi Fujitani, Gunma (JP); Toru Gotoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/520,607

(22) Filed: Mar. 7, 2000

(30) Foreign Application Priority Data

May 6, 1999 (JP) .......................................... 11-126467

(51) Int. Cl.[7] ................................................ G06F 17/60

(52) U.S. Cl. ....................... 235/379; 235/380; 235/381; 235/375; 235/492; 380/24; 380/23

(58) Field of Search ................................ 235/379, 375, 235/492, 380, 381; 380/24, 23

(56) References Cited

U.S. PATENT DOCUMENTS 4,159,517 A * 6/1979 Paradine et al. .............. 710/57
4,458,317 A * 7/1984 Horigome et al. ............ 705/30
4,771,460 A * 9/1988 Tamada et al. ............. 235/380
4,864,108 A * 9/1989 Hamada et al. ............. 235/379
5,257,011 A * 10/1993 Beigel ...................... 340/10.42
5,260,613 A * 11/1993 Leyendecker ................ 326/62
5,499,017 A * 3/1996 Beigel ..................... 340/10.32
5,586,327 A * 12/1996 Bealkowski et al. ........... 713/2
5,666,531 A * 9/1997 Martin ....................... 707/204
6,199,049 B1 * 3/2001 Conde et al. ................. 705/16
6,209,057 B1 * 3/2001 Ban et al. ................... 711/111
6,209,791 B1 * 4/2001 Curry et al. ................ 235/441

FOREIGN PATENT DOCUMENTS

JP 62-42270 2/1987
JP 9-231437 9/1997
JP 2000149098 A 5/2000

* cited by examiner

*Primary Examiner*—Karl D. Frech
*Assistant Examiner*—Daniel Walsh
(74) *Attorney, Agent, or Firm*—Staas & Halsey LLP

(57) ABSTRACT

In a transaction record storing device of a transaction machine, electronic journal data including transaction contents are stored into a storage medium whose stored data is unalterable or a storage medium which keeps its data alteration record. This ensures a guarantee of the truth with respect to the electronic journal data stored in the storage medium.

26 Claims, 8 Drawing Sheets

TRANSACTION RECORD STORING DEVICE AND TRANSACTION MACHINE INCLUDING SAME

BACKGROUND OF THE INVENTION

1. Field of the Invention

The present invention relates to a transaction record storing device for electronically recording the contents of transactions carried out in an automatic transaction machine installed in a bank or the like, and further relates to a transaction machine provided with functions of such a transaction record storing device.

2. Description of the Related Art

When a transaction such as deposit, withdrawal or transfer is performed in an automatic transaction machine such as an automatic tellers machine installed in a bank or the like, the contents of the performed transaction should be recorded as journal data (machine operation record data).

It was stipulated in a former law that the following conditions should be satisfied with respect to recordation of journal data:

To print on a paper medium an operation record in an automatic tellers machine.

To keep the printed paper medium for a predetermined time.

Therefore, every time a transaction occurs in an automatic tellers machine having a configuration as shown in FIG. 10, data indicative of the contents of the transaction is transferred from a control section 100 to a journal printer 450 where the transaction contents and an emboss image of a card used in the transaction are printed on journal paper P, and the printed journal paper P is preserved for a predetermined time in a bank or the like.

FIG. 11 is a block diagram for explaining an operation of the control section 100. The control section 100 comprises a communication control section 531, a transaction control section 501 and a journal data control section 541. The journal data control section 541 receives center information from the communication control section 531, transaction information such as a transaction time, a transaction item and a transaction amount from the transaction control section 501, and emboss image data on the surface of a card from a card unit 430, and edits them as journal data. Then, the journal data control section 541 confirms setting of the journal paper P via a paper runout detecting section (not shown) of the journal printer 450, and transfers the journal data to the journal printer 450 where the journal data is printed on the journal paper P.

According to the foregoing conventional technique, however, since the journal data should be printed on the journal paper P, when the journal paper P runs out, the machine is stopped in operation or the journal data control section 541 transfers the journal data to an external storage device such as a hard disk drive 810 for temporary storage therein until a new roll of journal paper P is supplemented. In the latter case, when the journal paper P is supplemented, the temporarily stored journal data is returned to the journal data control section 541 which then transfers the journal data to the journal printer 450 for printing on the journal paper P. When the printing is finished, the journal data stored in the external storage device is deleted.

Due to the foregoing constraint on the preserving manner of the journal data, the following problems have been raised:

As described above, the journal data is recorded and preserved on the paper medium. Thus, the journal printer 450 as well as the journal paper P are provided in the automatic tellers machine. Due to the sizes of the journal paper P and the machine, the number of printable transaction cases without supplementing the journal paper P can not be increased so much. Specifically, the number of printable transaction cases is about 2,000 per roll of the journal paper P and the machine has a space for only about two rolls of the journal paper P. Thus, if transactions are active, it is necessary that a clerk in charge manually supplements and recovers the journal paper P at frequent intervals.

Since the size of the journal paper P is large while the number of printable transaction cases per roll is not so large, an extensive space is required for keeping rolls of the journal paper P.

When the journal printer 450 is a thermal printer, the printed contents may become illegible due to aged deterioration.

When the journal data is temporarily stored in an external storage device such as the hard disk drive 810, if the external storage device is subjected to failure, the journal data is lost and can not be restored.

In consideration of the foregoing problems, the law has been revised to allow journal data to be preserved as electronic data. Still in this case, the following conditions should be satisfied:

<Guarantee of Truth>

To make it possible to confirm a record of alteration, such as correction, deletion or addition, of data.

To keep a document about a history of computer processing (e.g. description as to when, where and how writing of data was performed).

<Guarantee of Visibility>

To install an output device such as a display or a printer so that electronic data is visible.

To make it possible to retrieve data by setting a condition.

SUMMARY OF THE INVENTION

Therefore, it is an object of the present invention to provide a technique which can particularly satisfy the condition of the truth guarantee for preserving journal data as electronic data.

It is another object of the present invention to provide a technique wherein a delay in storage speed caused by a property of a storage medium used for storing electronic journal data is prevented from affecting reception of sequentially generated electronic journal data.

It is another object of the present invention to provide a technique wherein even if storage of electronic journal data into a storage medium fails, the storage of the journal data can be ensured.

It is another object of the present invention to provide a technique which allows, while writing electronic journal data, reception of new electronic journal data so as to prevent stoppage of a transaction machine.

It is another object of the present invention to provide a technique which can enhance safety of data storage by preventing received new electronic journal data from being lost, particularly in an arrangement wherein while writing electronic journal data, reception of new electronic journal data is allowed.

According to one aspect of the present invention, there is provided a transaction record storing device comprising a section for loading therein one of a first storage medium whose stored data is unalterable and a second storage medium which keeps its data alteration record, and for storing electronic journal data including at least transaction contents into the one of the first and second storage mediums.

Using such a first or second storage medium as a storage medium for the electronic journal data, a guarantee of the truth is ensured with respect to the electronic journal data stored therein. As such a storage medium, a CD-R or the like may be used.

It may be arranged that the first storage medium is an exchangeable storage medium into which the electronic journal data is written in a disk-at-once manner. Since the electronic journal data is written in the disk-at-once manner, the electronic journal data stored in the storage medium is unalterable.

It may be arranged that the second storage medium is an exchangeable storage medium into which new data is writable while stored data remains unchanged therein. In this case, the data may be written into the storage medium in a track-at-once or packet-write manner.

It may be arranged that given management data for identifying the one of the first and second storage mediums is recorded in advance as a header thereof. In this arrangement, the given data (e.g. serial number) which can be used for management of the storage medium is recorded in advance, such as upon production of the storage medium, as a header (e.g. volume label) of the storage medium. Thus, when the header includes such data not used for the medium management or when a plurality of headers having the same contents exist, it is known that an unfair practice has occurred. Accordingly, by managing the headers of the storage mediums, such an unfair practice can be found out quickly. Further, this arrangement facilitates retrieval of the preserved electronic journal data through easy identification of the required storage medium.

It may be arranged that given management data for identifying the one of the first and second storage mediums is recorded as a header thereof upon writing the electronic journal data thereinto. In this arrangement, the given management data is recorded upon writing the electronic journal data into the storage medium.

It may be arranged that given management data for identifying the one of the first and second storage mediums is recorded on a casing thereof after finishing writing of the electronic journal data thereinto. This facilitates easy identification of the required storage medium by, for example, printing a machine number and a medium number (serial number) on the surface of the casing of the storage medium.

According to another aspect of the present invention, there is provided a transaction record storing device comprising an overwritable buffer means for temporarily storing electronic journal data including at least transaction contents; and a data writing means for loading therein one of a first storage medium whose stored data is unalterable and a second storage medium which keeps its data alteration record, and for reading the electronic journal data from the buffer means and writing the read electronic journal data into the one of the first and second storage mediums.

There is no particular limitation to a structure of the buffer means. It is preferable, however, that the buffer means is high in data write and read speed and may be a hard disk drive, an MO drive or the like. The buffer means is overwritable because the buffer means does not need to keep such electronic journal data that has been written into the storage medium, and because it is better to release an area of the buffer means to receive new electronic journal data therein.

It may be arranged that the data writing means reads the electronic journal data from the buffer means and writes the read electronic journal data into the first storage medium when a storage amount of the electronic journal data in the buffer means reaches a predetermined value or when an operator inputs a corresponding command, and that the buffer means is allowed to store new electronic journal data after writing of the electronic journal data into the first storage medium is finished. With this arrangement, even if the writing of the electronic journal data into the storage medium fails, the electronic journal data subjected to the writing is maintained in the buffer means. In this arrangement, the electronic journal data is read from the buffer means and written into the storage medium when the storage amount in the buffer means reaches the predetermined value. The reason is as follows: When, for example, the electronic journal data is written into the storage medium in the disk-at-once manner, the storage efficiency of the storage medium is reduced if the data is written into the storage medium in a small amount because a nonused area of the storage medium is wasted. As appreciated, there is no problem with respect to the arrangement wherein the electronic journal data is written into the storage medium in response to the corresponding command inputted by the operator.

It may be arranged that when the writing of the electronic journal data into the first storage medium fails, the data writing means reads again from beginning the electronic journal data stored in the buffer means and writes the read electronic journal data into a new storage medium. As described above, since the electronic journal data is maintained when the writing thereof into the storage medium fails, it is possible to write it into a new storage medium.

It may be arranged that the buffer means stores a plurality of files and, while the electronic journal data is written into the first storage medium from one of the files, new electronic journal data is stored into another of the files. With this arrangement, even while the electronic journal data is written into the storage medium, new electronic journal data can be received into the buffer means, thereby preventing stoppage of the device. This is particularly useful when the write speed of the storage medium is low.

It may be arranged that the transaction record storing device further comprises another overwritable buffer means for storing the electronic journal data of the same contents. For realizing this, the electronic journal data of the same contents may be simultaneously stored into a plurality of buffer means in a hardware fashion, or the electronic journal data is first stored into one of the buffer means and then copied into another buffer means in a software mirroring fashion.

It may be arranged that the electronic journal data stored in the buffer means is read in sequence and written into the second storage medium and that the electronic journal data subjected to writing into the second storage medium is maintained as it is in the buffer means until a storage amount of the electronic journal data in the second storage medium reaches a predetermined value and, when the storage amount reaches the predetermined value, a first area in the buffer means storing the electronic journal data subjected to the writing into the second storage medium is released to allow new electronic journal data to be overwritten in the first area. With this arrangement, until the storage amount of the electronic journal data in the storage medium reaches the predetermined value (e.g. maximum storage capacity of the storage medium), the electronic journal data subjected to the writing Is maintained in the buffer means. Thus, even if the writing of the electronic journal data into the storage medium fails, the electronic journal data subjected to the writing is maintained in the buffer means. On the other hand, when the writing into the storage medium is successful (i.e. when the storage amount in the storage medium reaches the predetermined value), an area in the buffer means storing the electronic journal data subjected to the writing is released to allow new electronic journal data to be overwritten in that area.

It may be arranged that a storage capacity of the buffer means is set greater than a storage capacity of the second storage medium so that a second area in the buffer means other than the first area is always allowed to store new electronic journal data. With this arrangement, new electronic journal data can be always stored into the buffer means while the stored electronic journal data is written into the storage medium in sequence.

It may be arranged that when the writing of the electronic journal data into the second storage medium fails, the data writing means reads again from beginning the electronic journal data stored in the first area of the buffer means and writes the read electronic journal data into a new storage medium. As described above, since the electronic journal data subjected to the writing into the storage medium is maintained until the storage amount thereof in the storage medium reaches the predetermined value, when the writing thereof into the storage medium fails, it is possible to write the maintained electronic journal data into a new storage medium.

It may be arranged that the transaction record storing device further comprises an address managing section for managing a next write pointer for appointing a write start address of electronic journal data to be stored next into the buffer means, an output pointer for appointing a read address in the buffer means when writing electronic journal data from the buffer means into the second storage medium, and an initial value pointer for appointing a first read address in the buffer means of electronic journal data subjected to writing into the second storage medium, wherein new electronic journal data is stored into the buffer means according to the write start address appointed by the next write pointer, wherein the first read address is set to the initial value pointer when starting reading the electronic journal data from the buffer means, wherein the electronic journal data is read in sequence from the buffer means according to the read address appointed by the output pointer and written into the second storage medium, wherein the electronic journal data in the buffer means from the first read address appointed by the initial value pointer to the read address appointed by the output pointer is maintained as it is until the storage amount reaches the predetermined value, and wherein when the storage amount reaches the predetermined value, the first read address appointed by the initial value pointer is set to coincide with the read address appointed by the output pointer so that new electronic journal data is overwritable in the first area of the buffer means. With this arrangement, using the pointers, the electronic journal data can be read in sequence from the buffer means and written into the storage medium, while the electronic journal data subjected to the writing into the storage medium is maintained until the storage amount in the storage medium reaches the predetermined value, and further, when the storage amount reaches the predetermined value, new electronic journal data can be overwritten on the maintained electronic journal data.

It may be arranged that a storage capacity of the buffer means is set greater than a storage capacity of the second storage medium and that the write start address of the next write pointer is set to an address in an area other than the first area of the buffer means. With this arrangement, new electronic journal data can be always stored into the buffer means while the stored electronic journal data is written into the storage medium in sequence.

It may be arranged that when the writing of the electronic journal data into the second storage medium fails, the data writing means reads again from beginning the electronic journal data stored in the buffer means from the first read address appointed by the initial value pointer to the read address appointed by the output pointer and writes the read electronic journal data into a new storage medium. As described above, since the electronic journal data subjected to the writing into the storage medium is maintained until the storage amount thereof in the storage medium reaches the predetermined value, when the writing thereof into the storage medium fails, it is possible to write the maintained electronic journal data into a new storage medium.

According to another aspect of the present invention, there is provided a transaction machine for performing transaction processing about money through manipulation by an operator, the machine comprising a transaction storing section for loading therein one of a first storage medium whose stored data is unalterable and a second storage medium which keeps its data alteration record, and for electronically recording electronic journal data about performed transaction contents into the one of the first and second storage mediums.

The transaction machine includes an automatic tellers machine installed in a bank or the like, and the transaction storing section corresponds to one of the foregoing transaction record storing devices.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

First Embodiment

Figure 1:
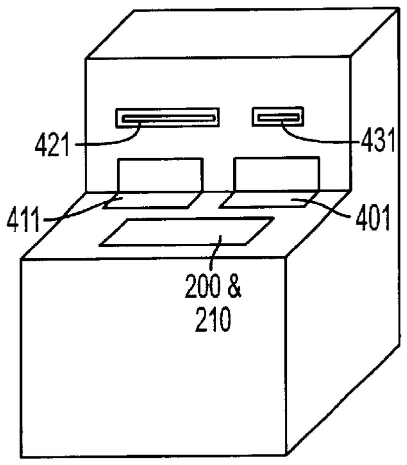
FIG. 1 is a perspective view of an automatic tellers machine provided with functions of a transaction record storing device according to a first preferred embodiment of the present invention.

FIG. 1 is a perspective view of an automatic tellers machine installed in a bank or the like, which is provided with functions of a transaction record storing device according to the first preferred embodiment of the present invention. In the figure, numeral 421 denotes a passbook in-out port of a passbook unit 420, 431 a card in-out port of a card unit 430 (the card in-out port 431 also serves as a receipt issuing port of a receipt unit 440), 411 a coin in-out port of a coin unit 410, 401 a bill in-out port of a bill unit 400, and 200 and 210 a combined arrangement of a customer operating touch panel 200 and a customer side LCD (liquid crystal display) 210.

Figure 2:
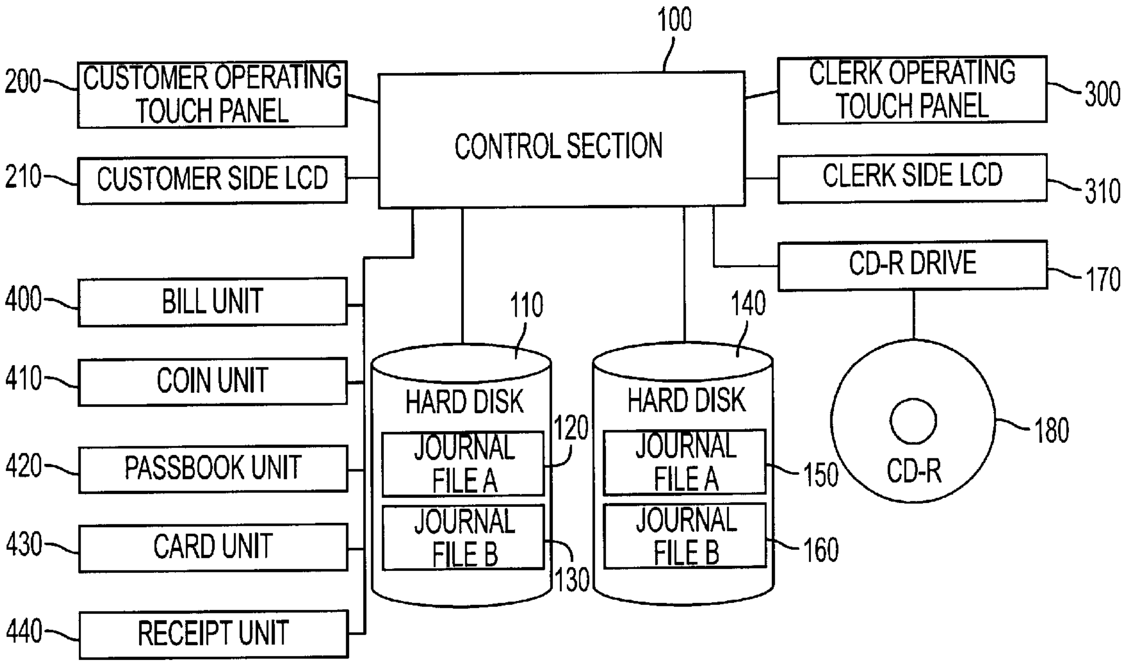
FIG. 2 is a block diagram showing a hardware configuration of the automatic tellers machine shown in FIG. 1.

FIG. 2 is a block diagram showing a hardware configuration of the automatic tellers machine shown in FIG. 1. As shown in FIG. 2, the automatic tellers machine comprises a control section 100, hard disks 110 and 140 serving as buffer means, respectively, a CD-R drive 170 serving as a data writing means, the customer operating touch panel 200, the customer side LCD 210, a clerk operating touch panel 300, a clerk side LCD 310, the bill unit 400, the coin unit 410, the passbook unit 420, the card unit 430, and the receipt unit 440.

Figure 3:
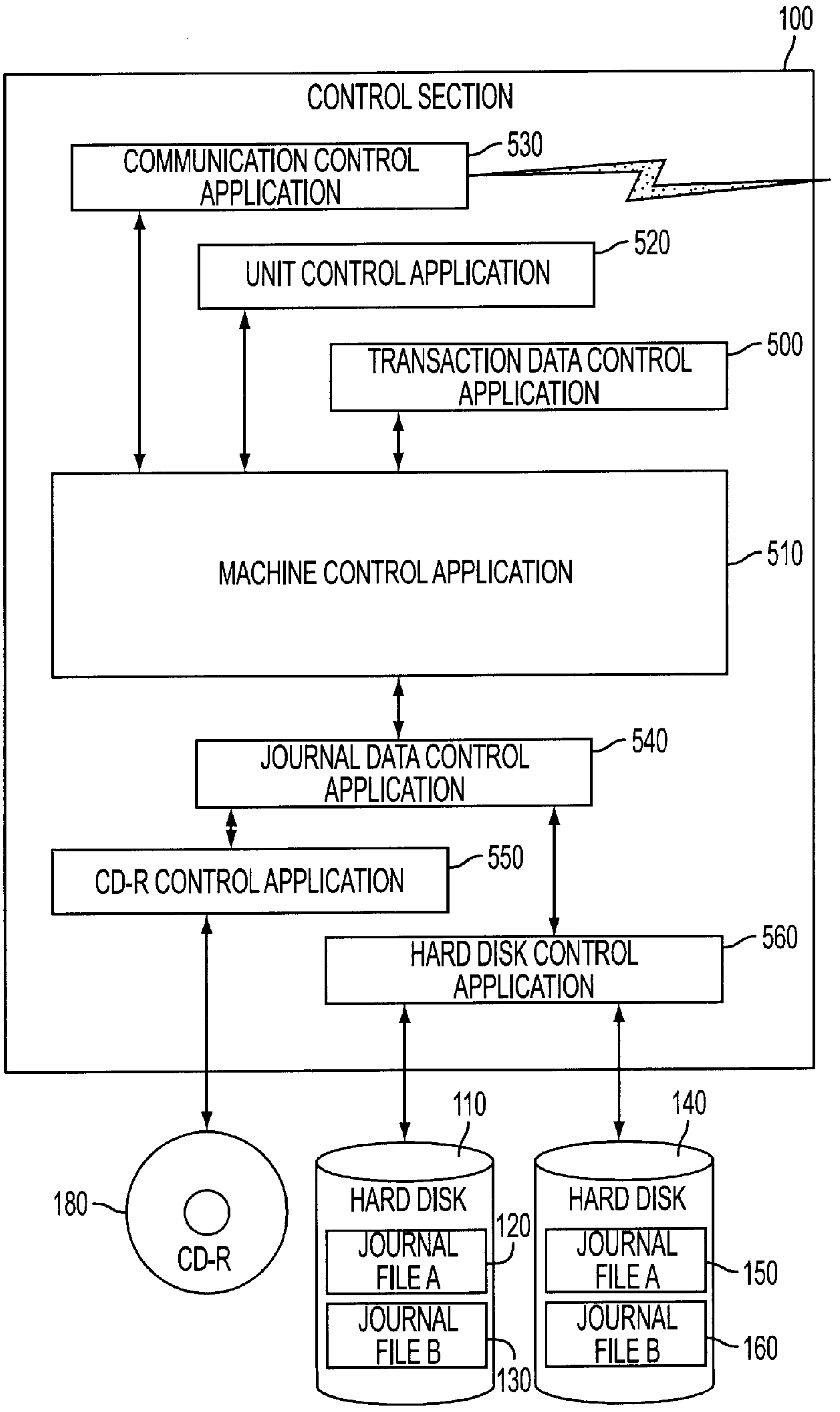
FIG. 3 is a block diagram showing an instruction system among applications which realize functions of a control section of the automatic tellers machine shown in FIG. 1.

The control section 100 has functions of controlling an operation of the automatic tellers machine. These functions are realized by executing a transaction data control application 500, a machine control application 510, a unit control application 520, a communication control application 530, a journal data control application 540, a CD-R control application 550 and a hard disk control application 560 as shown in FIG. 3.

The hard disks 110 and 140 serve as the buffer means as described above. The hard disk 110 stores electronic journal data inputted by a customer into a journal file A 120 or a journal file B 130. It is arranged that the journal file A 120 and the journal file B 130 are used alternatively and thus not used simultaneously. With this arrangement, while one of the journal files A and B 120 and 130 is stored into a CD-R (compact disc recordable) 180 from the hard disk 110, new electronic journal data can be received into the other of the journal files A and B 120 and 130.

The hard disk 140 is used as a mirror disk of the hard disk 110 and stores into journal file A 150 and journal filed B 160 the contents identical to those of the journal files A and B 120 and 130 of the hard disk 110. This arrangement prevents journal files once stored in the hard disk 110 from being lost before or during writing into the CD-R 180.

The CD-R drive 170 serves as the data writing means as described above, and has a function of writing the journal file read from the hard disk 110 or 140, into the CD-R 180 loaded in the CD-R drive 170. In this embodiment, the CD-R drive 170 writes the journal file into the CD-R 180 in a disk-at-once manner so that the CD-R 180 serves as an unalterable storage medium whose stored data can not be altered.

The customer operating touch panel 200 is an input device which is operated by a customer for inputting a given command or item. The customer operating touch panel 200 is used in combination with the customer side LCD 210, so that the customer operates the touch panel 200 while watching a display screen of the customer side LCD 210.

The customer side LCD 210 is an output device for displaying necessary information to a customer. The customer side LCD 210 displays a guide message about operation, a confirmation message about money or the like, and other necessary items, to a customer.

The clerk operating touch panel 300 is an input device which is operated by a clerk of a bank or the like for inputting a given command or item. The clerk operating touch panel 300 is used in combination with the clerk side LCD 310, so that the clerk operates the touch panel 300 while watching a display screen of the clerk side LCD 310.

The clerk side LCD 310 is an output device for displaying necessary information to a clerk. The clerk side LCD 310 displays a cause of a trouble generated in the machine, a measure therefor or the like, and further displays, if necessary, a message for calling a service company or the like.

The bill unit 400 is a unit for receiving or discharging a bill via the bill in-out port 401, so that a bill received therein due to deposit or the like is discharged due to withdrawal or the like.

The coin unit 410 is a unit for receiving or discharging a coin via the coin in-out port 411, so that a coin received therein due to deposit or the like is discharged due to withdrawal or the like.

The passbook unit 420 is a unit for reading data entered in a passbook inserted via the passbook in-out port 421, such as entered lines in the passbook, and for printing on the passbook.

The card unit 430 is a unit for acquiring magnetically recorded information of a card inserted via the card in-out port 431, and optically read information about an embossed portion of the card.

The receipt unit 440 is a unit for printing on a receipt. The printed receipt is discharged to the exterior via the card in-out port 431.

FIG. 3 is a block diagram showing an instruction system among the foregoing applications which realize the functions of the control section 100 as described before.

The transaction data control application 500 edits transaction content data and card emboss data (image data) so as to produce electronic journal data pursuant to an electronic journal record format.

The machine control application 510 implements a transaction control of the automatic tellers machine and has the following functions:

To control inputs from the customer operating touch panel 200 and the clerk operating touch panel 300.

To control outputs to the customer side LCD 210 and the clerk side LCD 310.

To request a unit control to the unit control application 520.

To request a communication control to the communication control application 530.

To transfer electronic journal data received from the transaction data control application 500, to the journal data control application 540.

To transfer a retrieval condition to the journal data control application 540.

To transfer a journal file to the CD-R control application 550 for writing of the journal file by the CD-R drive 170.

To control an output of a retrieval result to the clerk side LCD 310.

To implement a print control of electronic journal data to the receipt unit 440.

To check an amount of electronic journal data (journal file) stored in the hard disk 110.

To demand a transfer of a journal file to the journal data control application 540 when the journal file is detected to be full (about 600MB) in the hard disk 110.

To request the journal data control application 540, when the journal file is detected to be full in the hard disk 110, to switch from the full journal file to the other journal file in the hard disk 110.

To transfer the transferred journal file to the journal data control application 540 and to request storage thereof into the CD-R 180.

The unit control application 520 controls the bill unit 400, the coin unit 410, the passbook unit 420, the card unit 430 and the receipt unit 440, respectively, according to the contents requested by the machine control application 510 and returns results to the machine control application 510.

The communication control application 530 implements communication with a host (not shown) according to the contents requested by the machine control application 510 to confirm whether the contents of a transaction are warrantable. Specifically, the communication control application 530 notifies a password, an account number, a transaction amount, a transfer destination in case of a transfer and the like to the host and receives transaction propriety, notification print data, particulars print data and the like from the host.

The journal data control application 540 transfers electronic journal data to the hard disk control application 560 and requests storage thereof into the hard disk 110. The journal data control application 540 also has a function of notifying the machine control application 510 of a result of retrieval of electronic journal data stored in the hard disk 110 using a given retrieval condition.

The CD-R control application 550 implements storage or writing of a journal file transferred from the journal data control application 540, into the CD-R 180.

The hard disk control application 560 stores electronic journal data transferred from the journal data control application 540, into the hard disk 110 as a journal file A or B. Further, the hard disk control application 560 copies the journal file stored in the hard disk 110 into the hard disk 140 in sequence. Thus, the hard disk 140 serves as a mirror disk of the hard disk 110.

Now, an operation of the foregoing automatic tellers machine will be described hereinbelow.

A procedure of writing electronic journal data into the hard disks 110 and 140 will be first described. When, for example, a withdrawal transaction is performed, a customer inserts a card into the card unit 430 and inputs a transaction item, a password and a transaction amount using the customer operating touch panel 200 and the customer side LCD 210.

The machine control application 510 sends the inputted data to the host via the communication control application 530 to confirm whether the contents of the transaction are warrantable. Specifically, the machine control application 510 notifies the password, an account number, the transaction item, the transaction amount and the like to the host and receives transaction propriety, notification print data, particulars print data and the like from the host.

When it is notified from the host that the transaction is proper, the machine control application 510 handles the transaction as having been established. Specifically, the machine control application 510 request the unit control application 520 to read card emboss image data using the card unit 430 and transfers the card emboss image data to the transaction data control application 500 along with the password, the account number, the transaction item, the transaction amount, the notification print data, the particulars print data and the like.

Figure 4:
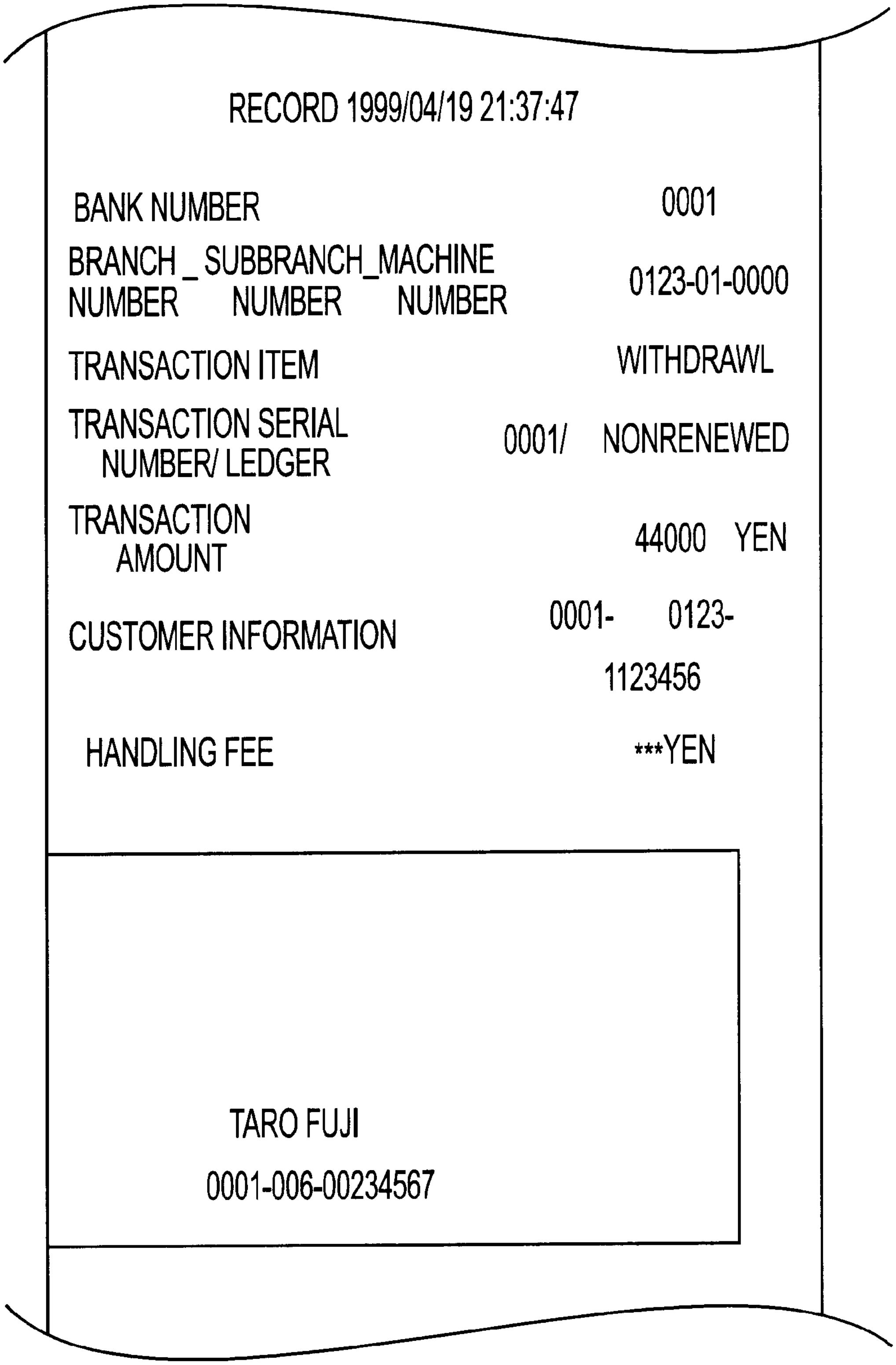
FIG. 4 is an explanatory diagram showing an example of edited electronic journal data.

As shown in FIG. 4, the transaction data control application 500 edits those data to produce electronic journal data comprising the following transaction contents:

Transaction Time

Account Number (including Bank Number and Branch Number)

Transaction Item (Withdrawal/ Deposit/Transfer/ Entry/ Inquiry)

Transaction Amount

Handling Fee

Card Emboss Data

The machine control application 510 requests the unit control application 520 to cause the bill unit 400 and the coin unit 410 to discharge cash, cause the card unit 430 to return a card and further cause the passbook unit 420 and the receipt unit 440 to perform given printing and then discharge a passbook and a receipt via the passbook in-out port 421 and the receipt issuing port 431, respectively.

Then, the machine control application 510 receives the edited electronic journal data from the transaction data control application 500 and transfers it to the journal data control application 540. Subsequently, the journal data control application 540 transfers the electronic journal data to the hard disk control application 560 and requests it to store the journal data into the hard disk 110.

The hard disk control application 560 stores the electronic journal data transferred from the journal data control application 540, into the journal file A or B in the hard disk 110. Further, the hard disk control application 560 copies the journal file stored in the hard disk 110 into the hard disk 140 in sequence.

Now, a procedure of retrieving electronic journal data will be described. First, a clerk inputs a retrieval condition using the clerk operating touch panel 300 and the clerk side LCD 310. The inputted retrieval condition is notified to the machine control application 510 which then notifies it to the journal data control application 540. The journal data control application 540 extracts, via the hard disk control application 560, one matching the condition from the journal file A or B stored in the hard disk 110 and notifies the retrieval result to the machine control application 510. The machine control application 510 displays the received retrieval result on the clerk side LCD 310. Through this displaying, a cause of a trouble caused in the machine and a measure therefor or the like may be clarified to the clerk, and if necessary, the clerk may be instructed to call a service company or the like.

Now, a procedure of writing electronic journal data into the CD-R 180 will be described. The machine control application 510 checks a storage amount of the journal file A or B in the hard disk 110. When the journal file A or B is detected to be full, the machine control application 510 displays on the clerk side LCD 310 to notify that a new CD-R 180 should be set. If the new CD-R 180 has already been set, this notification is not displayed. Further, when the journal file A or B is detected to be full, the machine control application 510 requests the journal data control application 540 to switch from the full journal file A or B to the other journal file B or A in the hard disk 110. Thus, the hard disk control application 560 stores new electronic journal data received thereafter into the journal file B or A in the hard disk 110. This ensures storage of new electronic journal data into the hard disk 110 while writing the full journal file into the CD-R 180.

The clerk sets the new CD-R 180 in the CD-R drive 170 and requests the machine control application 510 to write the full journal file into the CD-R 180 using the clerk operating touch panel 300 and the clerk side LCD 310. If the new CD-R 180 has already been set, this operation of the clerk is not required, either.

The machine control application 510 confirms via the CD-R control application 550 whether the CD-R 180 is set in the CD-R drive 170. When it is set, the machine control application 510 demands the hard disk control application 560 to transfer the full journal file A or B. Then, after receipt of the full journal file, the machine control application 510 transfers it to the CD-R control application 550 and requests it to store the full journal file into the CD-R 180.

The CD-R control application 550 stores the received journal file A or B into the CD-R 180. After the full journal file A or B has been stored into the CD-R 180, the hard disk control application 560 deletes the full journal file A or B or initializes it into a nonused state.

Other than the foregoing case wherein the machine control application 510 checks the storage amount of the journal file A or B to automatically implement storage into the CD-R 180, there is also a case wherein the clerk inputs a command upon emergency so that storage into the CD-R 180 is carried out. Specifically, in this case, the clerk uses the clerk operating touch panel 300 and the clerk side LCD 310 to request the machine control application 510 to store the journal file A or B into the CD-R 180.

In response to receipt of the request from the clerk, the machine control application 510 requests the hard disk control application 560 via the journal data control application 540 to switch from the journal file A or B to the journal file B or A. Thereafter, the machine control application 510 requests the CD-R control application 550 to store the journal file A or B, which is not being used, into the CD-R 180.

The CD-R control application 550 stores the received journal file A or B into the CD-R 180. After the journal file A or B has been stored into the CD-R 180, the hard disk control application 560 deletes or initializes the journal file A or B.

After the journal file A or B has been stored as described above, the clerk removes the CD-R 180 from the CD-R drive 170 and prints a machine number and a serial number on the surface of the CD-R 180. Then, the data stored in the CD-R 180 and other necessary data such as a storage date and a clerk in charge are inputted and stored in a data base system separately set for management. The clerk further preserves the CD-R 180 in a given keeping place. Instead of being printed on the surface of the CD-R 180, the foregoing serial number may be recorded as a header such as a volume label of the CD-R 180. Alternatively, during production of the CD-R 180, the serial number may be recorded as a volume label in advance.

Figure 5:
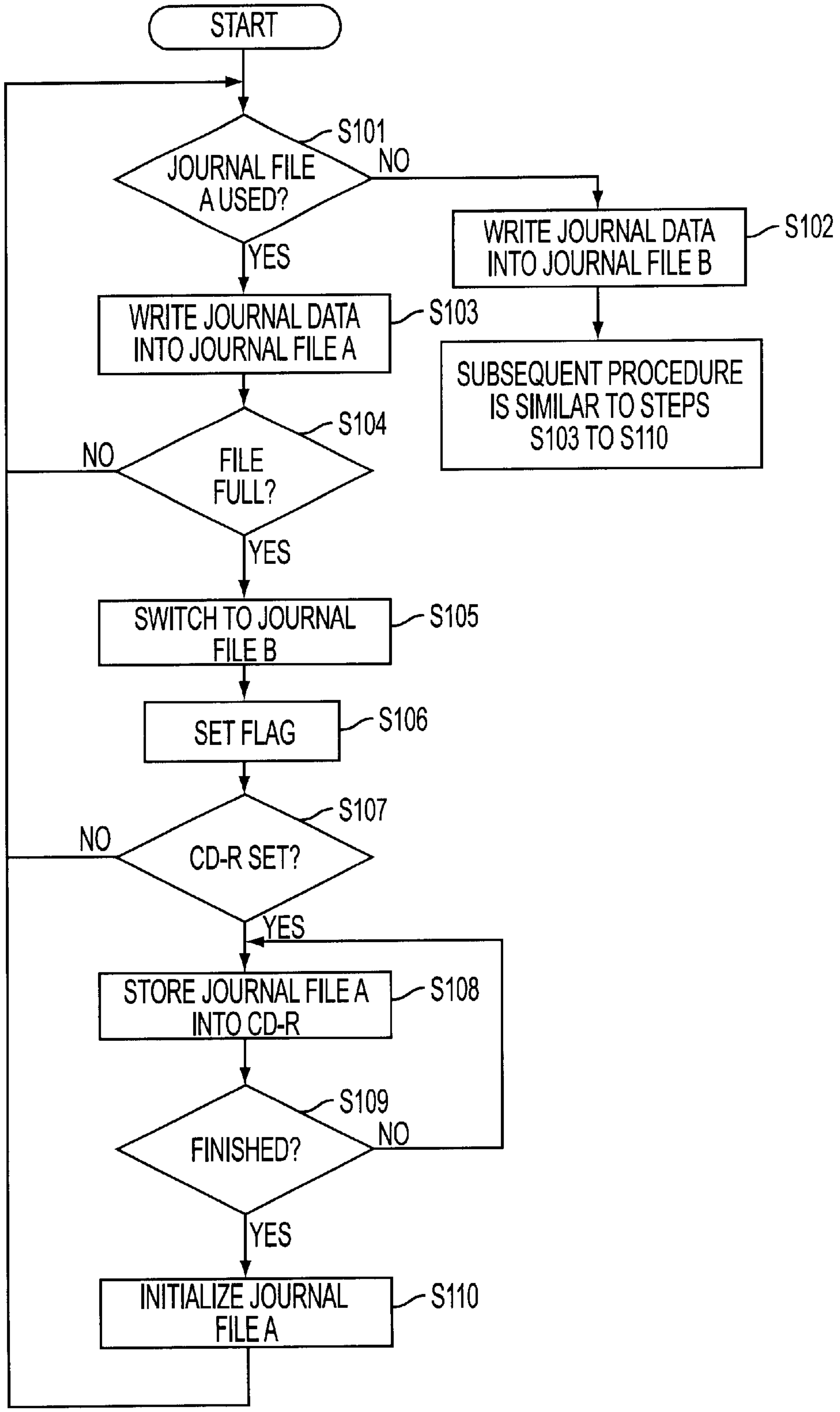
FIG. 5 is a flowchart showing a journal data writing procedure.

FIG. 5 is a flowchart showing the foregoing journal data writing procedure. First, a use-indicative flag of a journal file A is checked to confirm whether the journal file A is used (step S101). If the journal file A is not used (No at step S101), journal data is written into a journal file B (step S102). A subsequent procedure is the same as that represented by steps S103 through S110.

If the journal file A is used (Yes at step S101), the journal data is written into the journal file A (step S103).

Then, it is detected whether the journal file A is full (step S104). If it is not full (No at step S104), the routine returns to step S101. On the other hand, if the file is full (Yes at step S104), switching from the journal file A to the journal file B is implemented (step S105) and a use-indicative flag of the journal file B is set (step S106).

Subsequently, a set flag of a CD-R 180 is checked to confirm whether the CD-R 180 is set (step S107). If the CD-R 180 is not set (No at step S107), the routine returns to step S101. On the other hand, if the CD-R 180 is set (Yes at step S107), the journal file A is written into the CD-R 180 (step S108).

Then, it is checked whether writing of the journal file A into the CD-R 180 has been finished (step S 109). If not finished (No at step S109), the routine returns to step S108. On the other hand, if the storage has been finished (Yes at step S109), the journal file A is initialized (step S110). Then, the routine returns to step S101.

According to the foregoing first preferred embodiment, since the CD-R 180 into which writing is executed in a disk-at-once manner is used as a storage medium of electronic journal data, the truth guarantee is ensured with respect to the journal data stored in the CD-R 180.

The journal files A and B are provided in the hard disk 110 and switching therebetween is carried out such that while reading one of the journal files A and B and writing it into the CD-R 180, the other journal file receives new electronic journal data. Thus, even when journal data is written into the CD-R 180 whose write speed is low, sequentially generated journal data are received by the hard disk 110 into one of the journal files A and B so that reception of new electronic journal data can be independent of the writing into the CD-R 180, thereby preventing an operation of the automatic tellers machine from being stopped.

Since the journal file A or B is initialized after storage thereof into the CD-R 180 has been finished, even if the storage of the journal file A or B into the CD-R 180 fails, the journal file A or B can remain in the hard disks 110 and 140. Thus, the remaining journal file A or B can be read again from beginning and stored into another CD-R 180. This allows highly reliable data storage.

The hard disks 110 and 140 for storing the same contents, i.e. the same journal files A and the same journal files B, are provided. Thus, journal data once received in the hard disk 110 is prevented from being lost before or during storage into the CD-R 180 due to disk or file crash. This arrangement, when combined with the foregoing arrangement wherein the new journal data can be received during storage of the journal file into the CD-R 180, can achieve the data storage safety and the non-stoppage of the machine so as to further enhance the reliability.

In addition, the following advantages can be realized:

Since the CD-R 180 has a large storage capacity (maximum of 640MB) relative to the size thereof, the number of maintenance times can be reduced.

The CD-R 180 is extremely smaller in size as compared with the journal paper P when storing the same data amount, so that a keeping space of a warehouse or the like can be effectively used.

Since journal data is electronic data, retrieval of the journal data can be achieved using a computer.

Second Embodiment

Figure 6:
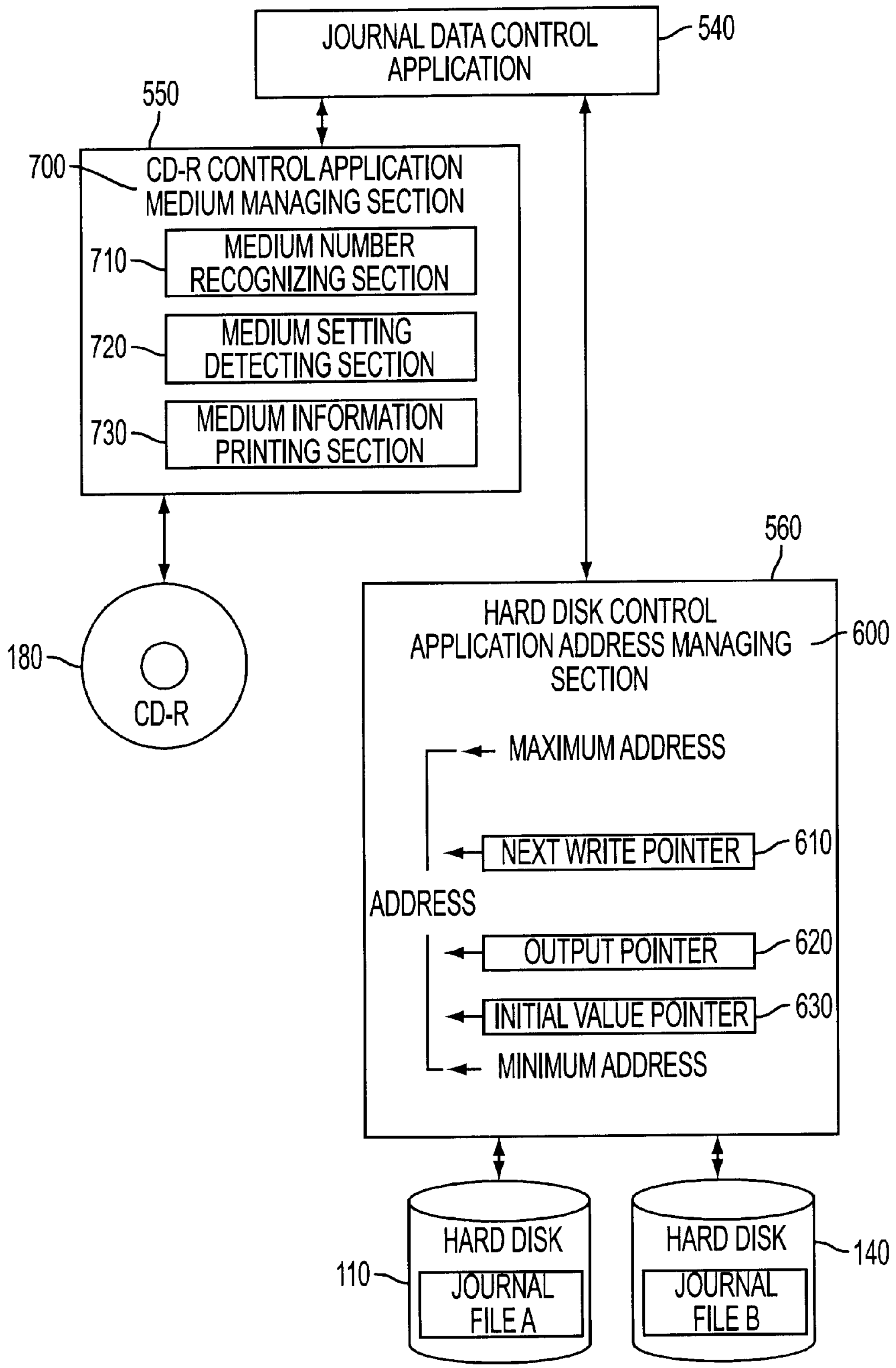
FIG. 6 a block diagram showing a software structure of a transaction record storing device including hard disks and a CD-R of an automatic tellers machine according to a second preferred embodiment of the present invention.

FIG. 6 is a block diagram showing a software structure of a transaction record storing device including hard disks 110 and 140 and a CD-R 180 of an automatic tellers machine according to the second preferred embodiment of the present invention. The other structure of the automatic tellers machine not shown in FIG. 6 is essentially the same as that of the foregoing first preferred embodiment. Thus, detailed explanation thereof will be omitted in the following description.

In FIG. 6, a hard disk control application 560 is provided with an address managing section 600, and a CD-R control application 550 is provided with a medium managing section 700. In this embodiment, data writing into the CD-R 180 is executed in a track-at-once or packet-write manner so that the CD-R 180 serves as a storage medium which keeps its data alteration record, i.e. wherein new data is writable while the stored data remains unchanged.

It is necessary in this embodiment that the capacity of each of the hard disks 110 and 140 be greater than the capacity of the CD-R 180 (maximum of 640MB). Specifically, in this embodiment, by way of precaution against failure of storage into the CD-R 180, electronic journal data subjected to storage into the CD-R 180 (hereinafter also referred to as "original journal data") is arranged to be maintained as minimum data in each of the hard disks 110 and 140. The maximum data amount to be maintained as the original journal data is set to be equal to the maximum capacity of the CD-R 180. Since each of the hard disks 110 and 140 further stores new electronic journal data, the storage capacity thereof should be greater than that of the CD-R 180.

The address managing section 600 manages a next write pointer 610, an output pointer 620 and an initial value pointer 630.

The next write pointer 610 is a pointer for appointing a write start address when writing journal data generated per transaction into the hard disks 110 and 140. After having reached the maximum address, the pointer 610 is updated to the minimum address.

The output pointer 620 is a pointer for appointing a read address in the hard disk 110 when storing journal data from the hard disk 110 into the CD-R 180 of the CD-R drive 170.

The initial value pointer 630 is a pointer for appointing a first read address in the hard disk 110 of electronic journal data subjected to storage into the CD-R 180. Even when the CD-R 180 is subjected to failure while writing electronic journal data thereinto, the intended data writing can be achieved by copying the journal data from an address appointed by the initial value pointer 630 to an address appointed by the output pointer 620 into a new CD-R 180. When the CD-R 180 is detected to be full, the initial value pointer 630 is reset to appoint the same address as that of the output pointer 620.

The medium managing section 700 comprises a medium number recognizing section 710, a medium setting detecting section 720 and a medium information printing section 730.

The medium number recognizing section 710 manages numbers of CD-R's 180. Specifically, the medium number recognizing section 710 records a medium number (serial number) produced in the section 710 as a volume label of the CD-R 180. Further, the medium number recognizing section 710 makes a check when the CD-R 180 is changed to new one before it becomes full, and indicates a medium number upon data retrieval.

The medium setting detecting section 720 confirms a setting state of the CD-R 180 into the CD-R drive 170. Upon detecting nonloading of the CD-R 180 or loading of a wrong medium, the medium setting detecting section 720 commands the machine control application 510 to stop data storage into the CD-R 180. This causes no influence to data storage into the hard disks 110 and 140.

The medium information printing section 730 prints a machine number and a medium number (serial number) on the surface of a casing of the CD-R 180.

As described before, the transaction data control application 500 edits electronic journal data with respect to a transaction established through a customer's operation of the customer operating touch panel 200. Then the transaction data control application 500 sends the electronic journal data to the hard disk control application 560 via the machine control application 510 and the journal data control application 540.

Figure 7:
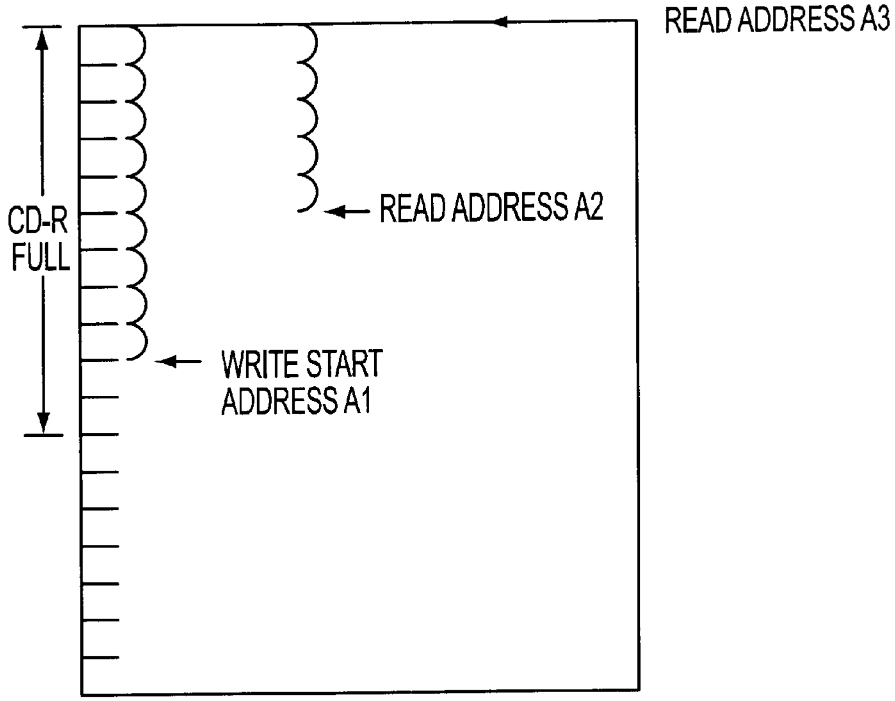
FIGS. 7 to 9 are diagrams for explaining address management in a hard disk implemented by an address managing section of the transaction record storing device shown in FIG. 6.

Then, as shown in FIG. 7, the electronic journal data is stored at a write start address Al in the hard disk 110 designated by the next write pointer 610 of the address managing section 600. The electronic journal data is also stored into the hard disk 140 likewise. The write start address A is incremented as A1', A1"—every time writing is finished.

On the other hand, when a write start address appointed by the next write pointer 610 has reached the maximum address, the next write start address is changed to the minimum address. Further, a write start address appointed by the next write pointer 610 is managed so as not to get ahead of a read address of the initial value pointer 630. This is necessary for the following reason: In this embodiment, the original journal data from a read address appointed by the initial value pointer 630 to a read address appointed by the output pointer 620 is maintained so that, even upon failure of storage into the CD-R 180, the original journal data still can be written into a new CD-R 180. Thus, if the write start address appointed by the next write pointer 610 gets ahead of the read address of the initial value pointer 630, overwriting on the original journal data is caused so that the original journal data can not be restored.

There is no particular limitation to the timing of writing electronic journal data of the hard disk 110 into the CD-R 180. If the capacity of the hard disk 110 is far greater (>>) than the capacity of the CD-R 180, writing of electronic journal data into the CD-R 180 may be carried out while reception of new electronic journal data is not so often or just before stoppage of the machine operation. In this embodiment, however, such writing is implemented when the storage amount of electronic journal data in the hard disk 110 not yet stored into the CD-R 180 reaches a predetermined value.

Upon performing such writing, the medium setting detecting section 720 confirms a setting state of the CD-R 180 relative to the CD-R drive 170. It is assumed here that the CD-R 180 is set in the CD-R drive 170. Then, the medium number recognizing section 710 records a medium number produced in the section 710 as a volume label of the CD-R 180.

Then, upon starting reading of electronic journal data from the hard disk 110, the address managing section 600 sets a first read address A3 to the initial value pointer 630 as shown in FIG. 7. As described above, this is for maintaining the original journal data from a read address appointed by the initial value pointer 630 to a read address appointed by the output pointer 620 so that, even upon failure of storage into the CD-R 180, the original journal data still can be written into a new CD-R 180. The read address A3 is not changed until the CD-R 180 is detected to be full.

As shown in FIG. 7, following a read address A2 appointed by the output pointer 620, electronic journal data is read from the hard disk 110 in sequence and stored into the CD-R 180. The read address A2 is incremented as A2', A2"—every time reading is executed.

The electronic journal data from the read address A3 set to the initial value pointer 630 to the read address A2 appointed by the output pointer 620 are maintained as they are until the storage amount of the electronic journal data in the CD-R 180 reaches the maximum capacity of the CD-R 180 (maximum of 640MB in this embodiment).

If the storage of the electronic journal data into the CD-R 180 is subjected to failure, the CD-R drive 170 sends a signal indicative of an occurrence of failure to the machine control application 510 which, in response to the signal, displays on the clerk side LCD 310 a message requiring a change of the CD-R 180. When the medium setting detecting section 720 detects setting of a new CD-R 180 in the CD-R drive 170 by the clerk, the medium number recognizing section 710 records a new medium number as a volume label of the new CD-R 180.

Then, the address managing section 600 again reads from beginning the electronic journal data from the read address A3 set to the initial value pointer 630 to the read address A2 appointed by the output pointer 620 and stores them into the new CD-R 180.

Figure 8:
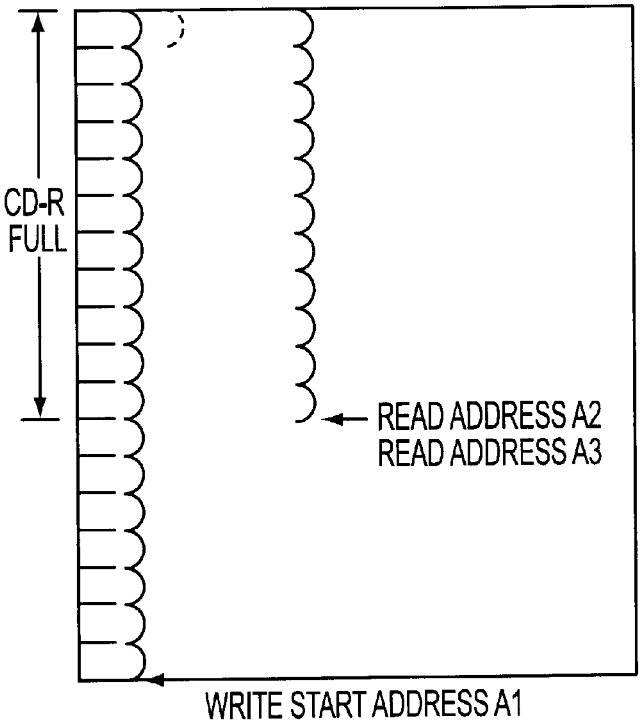
Figure 9:
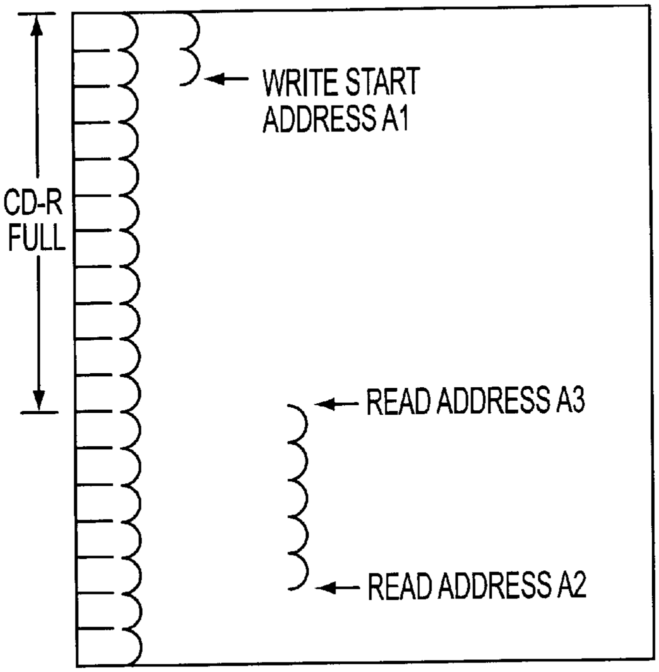
Figure 10:
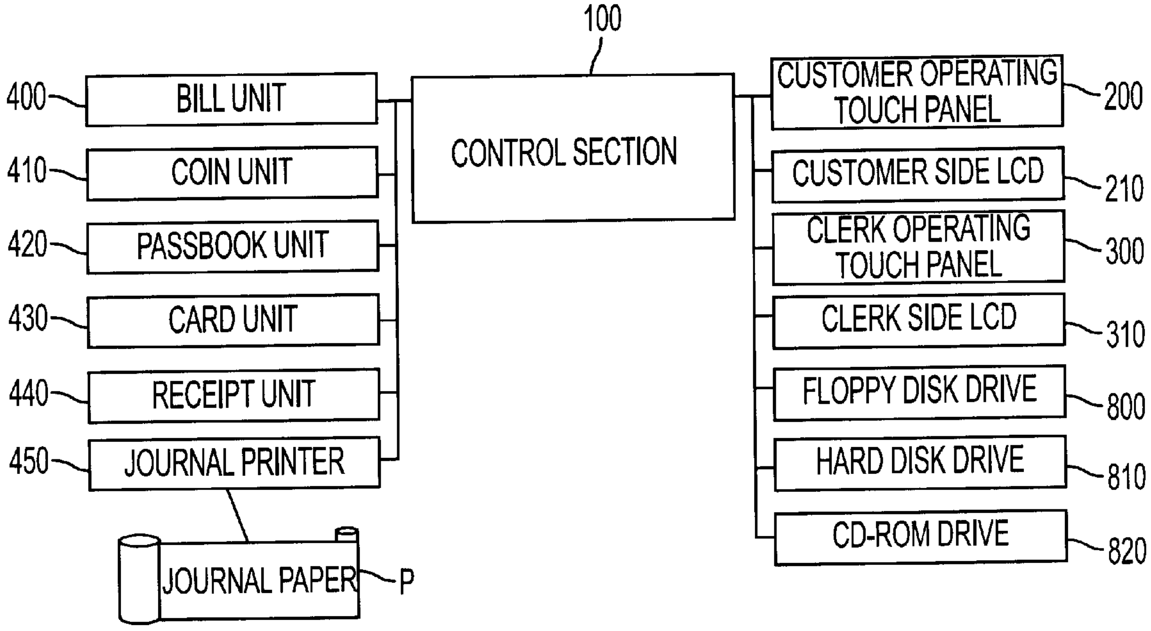
FIG. 10 (PRIOR ART)
FIG. 10 is a block diagram showing a hardware configuration of a conventional automatic tellers machine.
Figure 11:
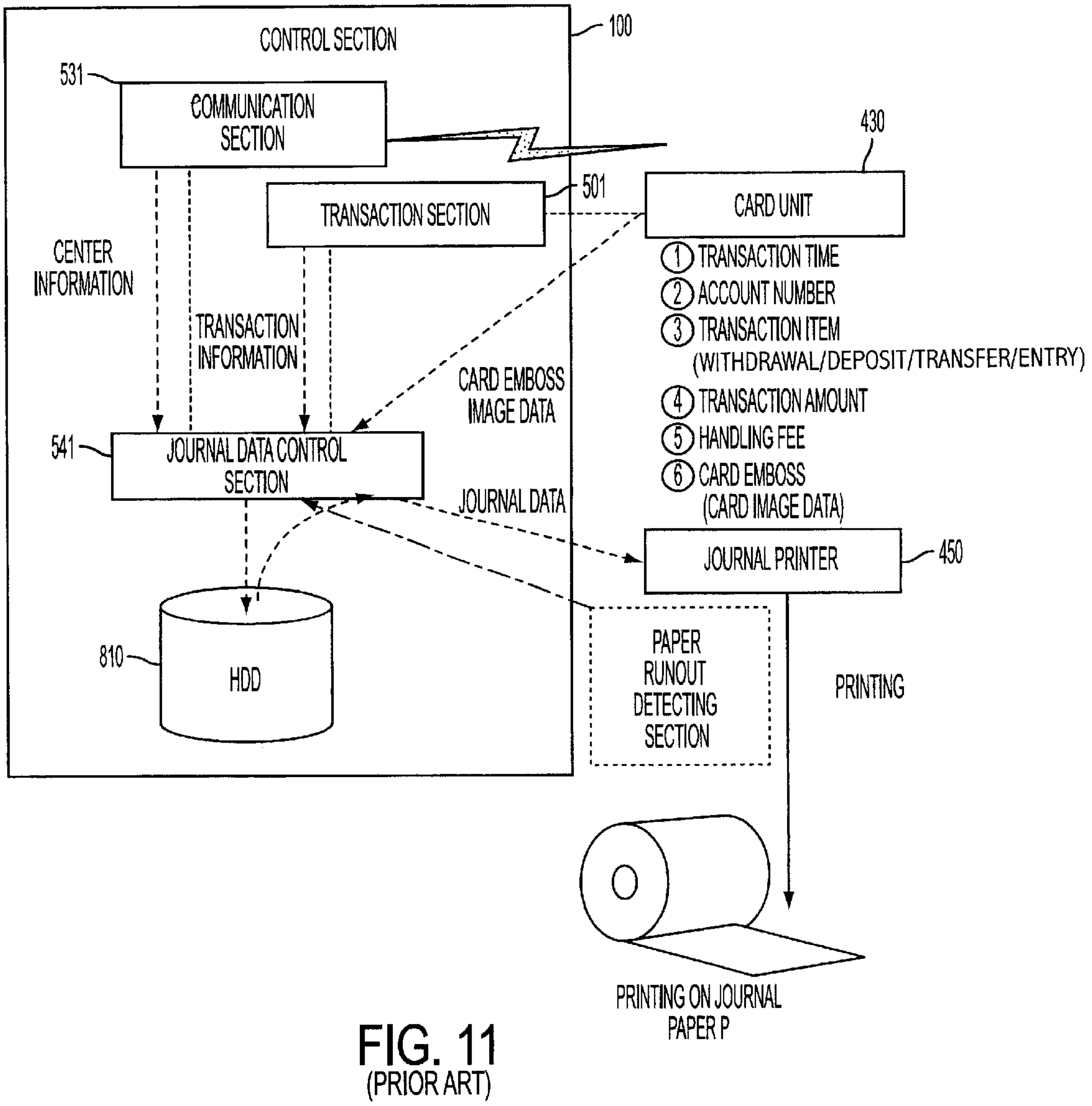
FIG. 11 (PRIOR ART)
FIG. 11 is a block diagram for explaining an operation of a control section of the conventional automatic tellers machine, which controls a journal printer to print journal data on journal paper.

As shown in FIG. 8, when the storage amount in the CD-R 180 reaches the maximum capacity thereof, the read address A3 of the initial value pointer 630 is reset to coincide with the read address A2 of the output pointer 620 from which the next storage into a new CD-R 180 is started. This allows a write start address A1 of the next write pointer 610 to be set in an area where the original journal data is stored (area from the address A3 to the address A2), so that new electronic journal data can be overwritten on the original journal data on that area. FIG. 9 shows the state wherein the write start address A1 appointed by the next write pointer 610 is set in the area where the original journal data is maintained.

When the CD-R 180 is detected to be full, the medium information printing section 730 of the medium managing section 700 prints a machine number and a medium number on the surface of a casing of the CD-R 180. This allows easy selection from among the CD-R's 180 upon performing data retrieval later.

If there remain more electronic journal data to be stored into the CD-R 180, the machine control application 510 displays on the clerk side LCD 310 a message requiring a new CD-R 180.

When the medium setting detecting section 720 detects removal of the CD-R 180 from the CD-R drive 170 or setting of a new CD-R 180 before the previous CD-R 180 does not become full, the medium setting detecting section 720 prohibits writing by the CD-R drive 170. For fear of breakage, it may be arranged to produce a pair of CD-R's 180 storing the identical data with each other.

According to the second preferred embodiment, since the CD-R 180 which keeps its data alteration record is used a storage medium of electronic journal data, the truth guarantee is ensured with respect to the journal data stored in the CD-R 180.

In the foregoing first preferred embodiment, the journal files A and B are required for preventing an operation of the machine from being stopped during writing of electronic journal data into the CD-R 180. On the other hand, in the second preferred embodiment, only the journal file A is required as shown in FIG. 6. Specifically, in the second preferred embodiment, electronic journal data are read from the journal file A in sequence and written into the CD-R 180 while new electronic journal data is written into the journal file A, thereby to prevent an operation of the machine from being stopped. On the other hand, as in the foregoing first preferred embodiment, the hard disk 140 is used as a mirror disk of the hard disk 110 to prevent journal data once received in the hard disk 110 from being lost before or during storage into the CD-R 180 due to disk or file crash.

In the second preferred embodiment, electronic journal data in the hard disk 110 subjected to storage into the CD-R 180 are maintained as they are until the storage amount of the electronic journal data in the CD-R 180 reaches the maximum capacity of the CD-R 180. Thus, even if the storage of the electronic journal data into the CD-R 180 is subjected to failure, the original journal data are maintained as they are in the hard disk 110. Accordingly, the maintained original journal data can be read again from beginning and stored into another CD-R 180, thereby ensuring reliable storage of the electronic journal data. On the other hand, when the storage into the CD-R 180 is successful, an area in the hard disk 110 storing the original journal data subjected to the storage into the CD-R 180 is released to allow new journal data to be received therein.

In the second preferred embodiment, it may be arranged that every time a write amount of electronic journal data into the CD-R 180 reaches a predetermined value, the read address A3 of the initial value pointer 630 is reset to coincide with the read address A2 of the output pointer 620 from which the next writing into the CD-R 180 is started. With this arrangement, every time a write amount of the electronic journal data into the CD-R 180 reaches the predetermined value, a corresponding area from the read address A3 to the read address A2 in the hard disk 110 is released for receiving new electronic journal data. Thus, the storage capacity of the hard disk 110 can be used more effectively.

While the present invention has been described in terms of the preferred embodiments, the invention is not to be limited thereto, but can be embodied in various ways without departing from the principle of the invention as defined in the appended claims.

What is claimed is:

1. A transaction record storing device comprising a section for loading therein one of a first storage medium having a physical property of disabling alteration of its stored data and a second storage medium having a physical property of keeping its data alteration record, and for storing electronic journal data including at least transaction contents into said one of the first and second storage mediums.

2. The transaction record storing device according to claim 1, wherein said first storage medium is an exchangeable storage medium into which the electronic journal data is written in a disk-at-once manner.

3. The transaction record storing device according to claim 1, wherein said second storage medium is an exchangeable storage medium into which new data is writable while stored data remains unchanged therein.

4. The transaction record storing device according to claim 1, wherein given management data for identifying said one of the first and second storage mediums is recorded in advance as a header thereof.

5. The transaction record storing device according to claim 1, wherein given management data for identifying said one of the first and second storage mediums is recorded as a header thereof upon writing the electronic journal data thereinto.

6. The transaction record storing device according to claim 1, wherein given management data for identifying said one of the first and second storage mediums is recorded on a casing thereof after finishing writing of the electronic journal data thereinto.

7. A transaction record storing device comprising:

overwritable buffer means for temporarily storing electronic journal data including at least transaction contents; and data writing means for loading therein one of a first storage medium having a physical property of disabling alteration of its stored data and a second storage medium having a physical property of keeping its data alteration record, and for reading the electronic journal data from said buffer means and writing the read electronic journal data into said one of the first and second storage mediums.

8. The transaction record storing device according to claim 7, wherein said data writing means reads the electronic journal data from said buffer means and writes the read electronic journal data into said first storage medium when a storage amount of the electronic journal data in said buffer means reaches a predetermined value or when an operator inputs a corresponding command, and wherein said buffer means is allowed to store new electronic journal data after writing of the electronic journal data into said first storage medium is finished.

9. A transaction record storing device comprising:

overwritable buffer means for temporarily storing electronic journal data including at least transaction contents; and data writing means for loading therein one of a first storage medium having a physical property of disabling alteration of its stored data and a second storage medium having a physical property of keeping its data alteration record, and for reading the electronic journal data from said buffer means and writing the read electronic journal data into said one of the first and second storage mediums, wherein said data writing means reads the electronic journal data from said buffer means and writes the read electronic journal data into said first storage medium when a storage amount of the electronic journal data in said buffer means reaches a predetermined value or when an operator inputs a corresponding command, and wherein said buffer means is allowed to store new electronic journal data after writing of the electronic journal data into said first storage medium is finished, and wherein when the writing of the electronic journal data into said first storage medium fails, said data writing means reads again from beginning the electronic journal data stored in said buffer means and writes the read electronic journal data into a new storage medium.

10. The transaction record storing device according to claim 8, wherein said buffer means stores a plurality of files and, while the electronic journal data is written into said first storage medium from one of said files, new electronic journal data is stored into another of said files.

11. The transaction record storing device according to claim 7, further comprising another overwritable buffer means for storing the electronic journal data of the same contents.

12. A transaction record storing device comprising:

overwritable buffer means for temporarily storing electronic journal data including at least transaction contents; and data writing means for loading therein one of a first storage medium having a physical property of disabling alteration of its stored data and a second storage medium having a physical property of keeping its data alteration record, and for reading the electronic journal data from said buffer means and writing the read electronic journal data into said one of the first and second storage mediums, wherein the electronic journal data stored in said buffer means is read in sequence and written into said second storage medium and wherein the electronic journal data subjected to writing into said second storage medium is maintained as it is in said buffer means until a storage amount of the electronic journal data in said second storage medium reaches a predetermined value and, when said storage amount reaches said predetermined value, a first area in said buffer means storing the electronic journal data subjected to the writing into said second storage medium is released to allow new electronic journal data to be overwritten in said first area.

13. The transaction record storing device according to claim 12, wherein a storage capacity of said buffer means is set greater than a storage capacity of said second storage medium so that a second area in said buffer means other than said first area is always allowed to store new electronic journal data.

14. The transaction record storing device according to claim 12, wherein when the writing of the electronic journal data into said second storage medium fails, said data writing means reads again from beginning the electronic journal data stored in said first area of said buffer means and writes the read electronic journal data into a new storage medium.

15. The transaction record storing device according to claim 12, further comprising an address managing section for managing a next write pointer for appointing a write start address of electronic journal data to be stored next into said buffer means, an output pointer for appointing a read address in said buffer means when writing electronic journal data from said buffer means into said second storage medium, and an initial value pointer for appointing a first read address in said buffer means of electronic journal data subjected to writing into said second storage medium, wherein new electronic journal data is stored into said buffer means according to the write start address appointed by said next write pointer, wherein the first read address is set to said initial value pointer when starting reading the electronic journal data from said buffer means, wherein the electronic journal data is read in sequence from said buffer means according to the read address appointed by said output pointer and written into said second storage medium, wherein the electronic journal data in said buffer means from the first read address appointed by said initial value pointer to the read address appointed by said output pointer is maintained as it is until said storage amount reaches said predetermined value, and wherein when said storage amount reaches said predetermined value, the first read address appointed by said initial value pointer is set to coincide with the read address appointed by said output pointer so that new electronic journal data is overwritable in said first area of said buffer means.

16. The transaction record storing device according to claim 15, wherein a storage capacity of said buffer means is set greater than a storage capacity of said second storage medium and wherein the write start address of said next write pointer is set to an address in an area other than said first area of said buffer means.

17. The transaction record storing device according to claim 15, wherein when the writing of the electronic journal data into said second storage medium fails, said data writing means reads again from beginning the electronic journal data stored in said buffer means from the first read address appointed by said initial value pointer to the read address appointed by said output pointer and writes the read electronic journal data into a new storage medium.

18. The transaction record storing device according to claim 7, wherein said first storage medium is an exchangeable storage medium into which the electronic journal data is written in a disk-at-once manner.

19. The transaction record storing device according to claim 7, wherein said second storage medium is an exchangeable storage medium into which new data is writable while stored data remains unchanged therein.

20. The transaction record storing device according to claim 7, wherein given management data for identifying said one of the first and second storage mediums is recorded in advance as a header thereof.

21. The transaction record storing device according to claim 7, wherein given management data for identifying said one of the first and second storage mediums is recorded as a header thereof upon writing the electronic journal data thereinto.

22. The transaction record storing device according to claim 7, wherein given management data for identifying said one of the first and second storage mediums is recorded on a casing thereof after finishing writing of the electronic journal data thereinto.

23. A transaction machine for performing transaction processing about money through manipulation by an operator, said machine comprising a transaction storing section for loading therein one of a first storage medium having a physical property of disabling alteration of its stored data and a second storage medium having a physical property of keeping its data alteration record, and for electronically recording electronic journal data about performed transaction contents into said one of the first and second storage mediums.

24. A transaction record storing device comprising:

an overwritable buffer unit temporarily storing electronic journal data including at least transaction contents; and a data writing unit loading therein one of a first storage medium having a physical property of disabling alteration of its stored data and a second storage medium having a physical property of keeping its data alteration record, and for reading the electronic journal data from said buffer unit and writing the read electronic journal data into said one of the first and second storage mediums.

25. A transaction machine for performing transaction processing about money through manipulation by an operator, said machine comprising:

an overwritable buffer unit temporarily storing electronic journal data including at least transaction contents; and a data writing unit for loading therein one of a first storage medium having a physical property of disabling alteration of its stored data and a second storage medium having a physical property of keeping its data alteration record, and for reading the electronic journal data from said buffer unit and writing the read electronic journal data into said one of the first and second storage mediums, wherein said data writing unit reads the electronic journal data from said buffer unit and writes the read electronic journal data into said first storage medium when a storage amount of the electronic journal data in said buffer unit reaches a predetermined value or when an operator inputs a corresponding command, and wherein said buffer unit is allowed to store new electronic journal data after writing of the electronic journal data into said first storage medium is finished, and wherein when the writing of the electronic journal data into said first storage medium fails, said data writing unit reads again from beginning the electronic journal data stored in said buffer unit and writes the read electronic journal data into a new storage medium.

26. A transaction machine for performing transaction processing about money through manipulation by an operator, said machine comprising:

an overwritable buffer unit temporarily storing electronic journal data including at least transaction contents; and a data writing unit loading therein one of a first storage medium having a physical property of disabling alteration of its stored data and a second storage medium having a physical property of keeping its data alteration record, and for reading the electronic journal data from said buffer unit and writing the read electronic journal data into said one of the first and second storage mediums, wherein the electronic journal data stored in said buffer unit is read in sequence and written into said second storage medium and wherein the electronic journal data subjected to writing into said second storage medium is maintained as it is in said buffer unit until a storage amount of the electronic journal data in said second storage medium reaches a predetermined value and, when said storage amount reaches said predetermined value, a first area in said buffer unit storing the electronic journal data subjected to the writing into said second storage medium is released to allow new electronic journal data to be overwritten in said first area.

* * * * *